United States Patent [19]
Ueno et al.

[11] Patent Number: 5,899,316
[45] Date of Patent: * May 4, 1999

[54] APPARATUS AND METHOD FOR CONVEYING PIECES OF DOUGH

[75] Inventors: Sadao Ueno; Hitoshi Kuwabara, both of Utsunomiya, Japan

[73] Assignee: Rheon Automatic Machinery Co., Ltd., Utsunomiya, Japan

[ * ] Notice: This patent is subject to a terminal disclaimer.

[21] Appl. No.: 08/984,679

[22] Filed: Dec. 3, 1997

[30] Foreign Application Priority Data

Dec. 4, 1996 [JP] Japan .................................. 8-324292

[51] Int. Cl.⁶ .................................................. B65G 47/26
[52] U.S. Cl. .................... 198/418.7; 198/412; 198/459.1
[58] Field of Search ................................ 198/418.7, 411, 198/413, 416, 459.1, 410, 412

[56] References Cited

U.S. PATENT DOCUMENTS 3,763,990  10/1973  Ousuka .................................. 198/412

FOREIGN PATENT DOCUMENTS 2432999   9/1974  Germany ............................... 198/374
4-158732  6/1992  Japan .............................. A21D 13/08

*Primary Examiner*—William E. Terrell
*Assistant Examiner*—Khoi H. Tran
*Attorney, Agent, or Firm*—Limbach & Limbach L.L.P.

[57] ABSTRACT

A compact apparatus for conveying triangular pieces of dough which are upside down group-by-group on a upstream conveyor to a downstream conveyor where each group of pieces of dough is separated from the remaining groups, and the pieces of dough of the group are separated from each other and simultaneously rotated 90 degrees in opposing directions per alternating group.

13 Claims, 6 Drawing Sheets

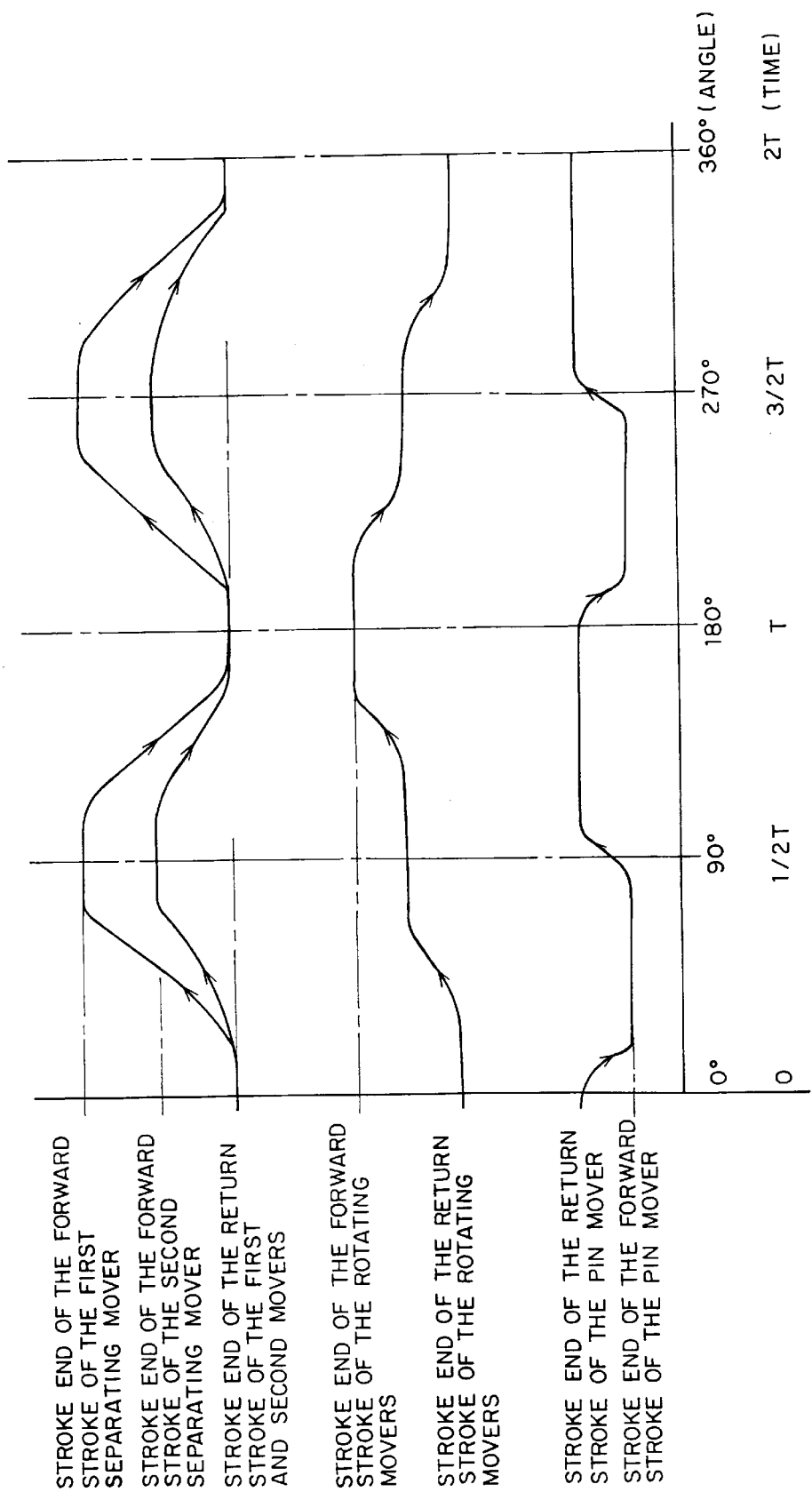

APPARATUS AND METHOD FOR CONVEYING PIECES OF DOUGH

FIELD OF THE INVENTION

This invention relates to an apparatus and method for laterally conveying a plurality of adjacent pieces of dough (for example, croissant dough), which each are, for example, in the shape of a triangle or trapezoid, and which are in lateral and transverse continuous arrays. In this specification, the term "transversely" means in a direction transverse of the lateral direction, and the term "lateral direction" means the direction in which the pieces of dough are conveyed on a conveyor.

DESCRIPTION OF THE PRIOR ART

In Japanese Patent (A) 4-158732 the applicant of this application discloses such an apparatus for laterally conveying triangular pieces of dough (croissant dough). In the apparatus an upstream conveyor and a downstream conveyor are laterally aligned to laterally convey pieces of dough. The upstream conveyor conveys a plurality of pieces of dough which are arranged laterally and transversely, where alternating groups of pieces of dough that are arranged transversely are upside down, in other words, where the base of each triangular piece of dough of the first group (transverse row) faces downward while the base of each triangular piece of dough of the second group faces upward. The downstream conveyor laterally conveys the pieces of dough while they are being separated from each other and are being rearranged with all their bases facing downward.

At the junction of the upstream and downstream conveyors (including the discharge portion of the upstream conveyor and the take-in portion of the downstream conveyor) a device for separating the pieces of dough from each other and a device for rotating the separated pieces of dough are laterally arranged. The device for separating the pieces of dough includes a plurality of separating holders, each of which holds a piece of dough from above. The device for separating the pieces of dough arranges each group of pieces of dough transversely in a staggered layout. The device for rotating the pieces of dough includes a plurality of rotating holders, each of which holds down and rotates a piece of dough. The device for rotating the pieces of dough rotates each group of pieces of dough through 90 degrees, alternately clockwise or counterclockwise, so that the bases of the triangular pieces of dough of all the groups face downward.

That is, when the upstream conveyor is operated, it laterally and sequentially conveys the pieces of dough which are alternately upside down group-by-group, and discharges them from its discharge portion to the take-in portion of the downstream conveyor. When it discharges a group of pieces of dough to the take-in portion of the downstream conveyor, the pieces of dough of the group are held from above and separated by the separating holders to be transversely rearranged in a staggered; layout, and are then released. Then, the pieces of dough of the group are held and rotated clockwise or counterclockwise by the rotating holders so that they face downstream. They are then released.

SUMMARY OF THE INVENTION

In the prior-art apparatus the pieces of dough happen to unintentionally be changed in the layout when they are transferred from the separating holders to the rotating holders. This causes a problem in that it is complicated to post-treat the pieces of dough which are carried downstream. Further, since the devices for separating and rotating the pieces of dough are laterally provided, this causes a problem wherein they occupy a large lateral space.

The present invention is to resolve the above problems. It aims to provide an improved method and an improved compact apparatus for separating and conveying pieces of dough.

To this end, the method of the present invention of laterally conveying pieces of dough, each of which has a base, and which are arranged laterally and transversely, by an upstream and a laterally adjacent downstream conveyor, wherein the bases of the transverse rows of the pieces of dough, each row defining a group, face in opposing directions group-by-group on the upstream conveyor, is comprised of the steps of (i) sequentially conveying the pieces of dough group-by-group from a discharge portion of the upstream conveyor to a take-in portion of the downstream conveyor; and (ii) separating each group of pieces of dough from the remaining groups when the groups are conveyed to the take-in portion, and simultaneously arranging the pieces of dough of each group in a transversely staggered layout and simultaneously rotating each of the pieces of dough of the groups substantially through 90 degrees group-by-group so that the base of each piece of dough access downstream in one aspect, the apparatus of the present invention for laterally conveying pieces of dough each of which has a base, from an upstream conveyor, where the pieces of dough are arranged laterally and transversely and the bases of the transverse rows of the pieces of dough, each row defining a group, ice in opposing directions group-by-group, to a laterally adjacent downstream conveyor where each group is separated from the remaining groups and the pieces of dough of the group are separated from each other and rotated substantially through 90 degrees in opposite directions group-by-group to be positioned in a transversely staggered layout, is comprised of a fist and second carriage mounted for lateral movement at the junction of the upstream and downstream conveyors, the first and second carriages being laterally spaced apart from each other; means for laterally reciprocating the first and second carriages in phase such that lateral reciprocating strokes of the first carriage are longer than those of the second carriage; first holders, each to be rotated about a vertical axis to hold and rotate a piece of dough, mounted on one side of the first carriage; second holders, each to be rotated about a vertical axis to hold and rotate a piece of dough, mounted on one side of the second carriage, the first and second holders being transversely aligned; and a rotating mechanism for rotating the first and second holders substantially through 90 degrees in opposing directions per forward stroke of the first and second holders when the first and second carriages are laterally reciprocated a plurality of times.

The other aspects of the apparatus will be apparent from the preferred embodiment, which is below explained by reference to the accompanying drawings.

BRIEF DESCRIPTION OF THE DRAWINGS

FIG. 6 is a timing chart for some elements of devices for separating and rotating the pieces of dough.

DESCRIPTION OF THE PREFERRED EMBODIMENT

Figure 5:
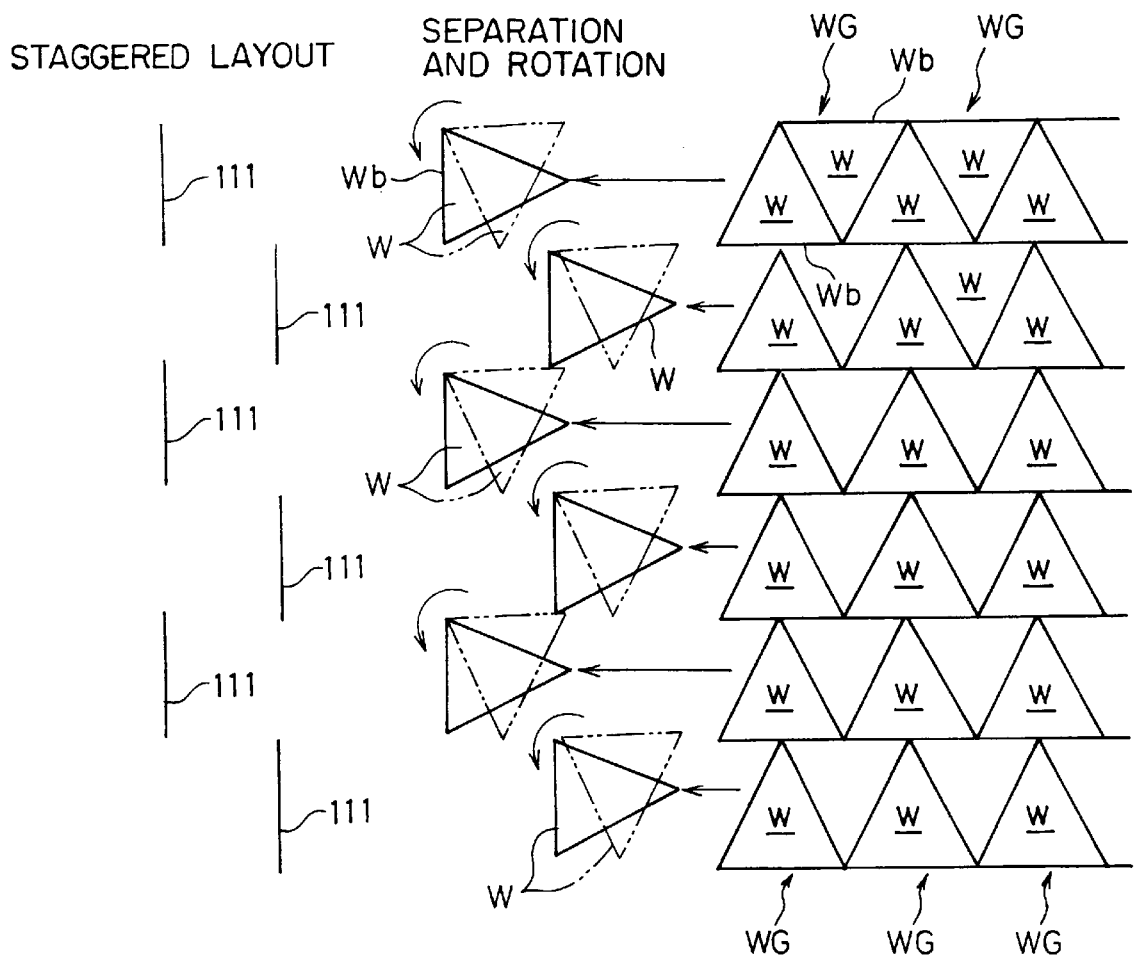
FIG. 5 is a plan view to show the separation and rotation of laterally and transversely arranged pieces of dough.

The preferred embodiment of the present invention is now explained by reference to the accompanying drawings. In reference to FIGS. 1, 2, 3, and 5, the apparatus 1, which separates and laterally conveys laterally- and transversely-adjacent pieces of dough W, includes an upstream conveyor 3 and a downstream conveyor 5. The conveyors 3, 5 are laterally aligned. In the embodiment each piece of dough W is triangular (for example, used for croissant dough) and has a side or base Wb. When desired, the shape of the dough may be trapezoidal or any other shape. As shown in FIG. 5, triangular pieces of dough W are comprised of groups (rows) WG of transversely arranged pieces of dough W. The base Wb of each piece of dough W of the first group WG faces downward, and the base Wb of each piece of dough W of the second group WG faces upward. The groups of pieces of dough are alternately upside down.

The upstream conveyor 3 laterally conveys these pieces of dough where they are adjacent to each other, as shown at the right side in FIG. 5. The downstream conveyor 5 laterally conveys the pieces of dough where the pieces of dough of a group are separated from each other and from the remaining groups, with the bases Wb of the pieces of dough W facing downward. As is known in the prior art, the upstream conveyor 3 operates at a speed faster than that of the downstream conveyor 5.

At the junction of the upstream and downstream conveyors 3, 5 (including the discharge portion (3 out) of the upstream conveyor 3 and the take-in portion (5 in) of the downstream conveyor 5), a pair of support frames 7, 7 are mounted. A laterally extending guide rail 9 (FIG. 3) is mounted on each frame 7 through a fixing bracket 11. A transversely extending first carriage 13 and second carriage 15, which are laterally spaced apart, are mounted on the pair of guide rails 9, 9 so that both carriages 13, 15 can move laterally. The first and second carriages 13, 15 are moved in synchronized reciprocating motions by a reciprocatingly-operating device 17 so that the lateral reciprocating strokes (forward and return strokes) of the first carriage 13 are longer than those of the second carriage 15.

In reference to FIGS. 1, 2, 3, and 4, a plurality of first holders 19 for holding a group of pieces of dough W from above are rotatably mounted on the upstream side of the first carriage 13 through corresponding fixing blocks 21, while a plurality of second holders 23 are rotatably mounted on the downstream side of the second carriage 15 through corresponding fixing blocks 25. The first and second holders 19, 23 are aligned in a transverse line.

Figure 1:
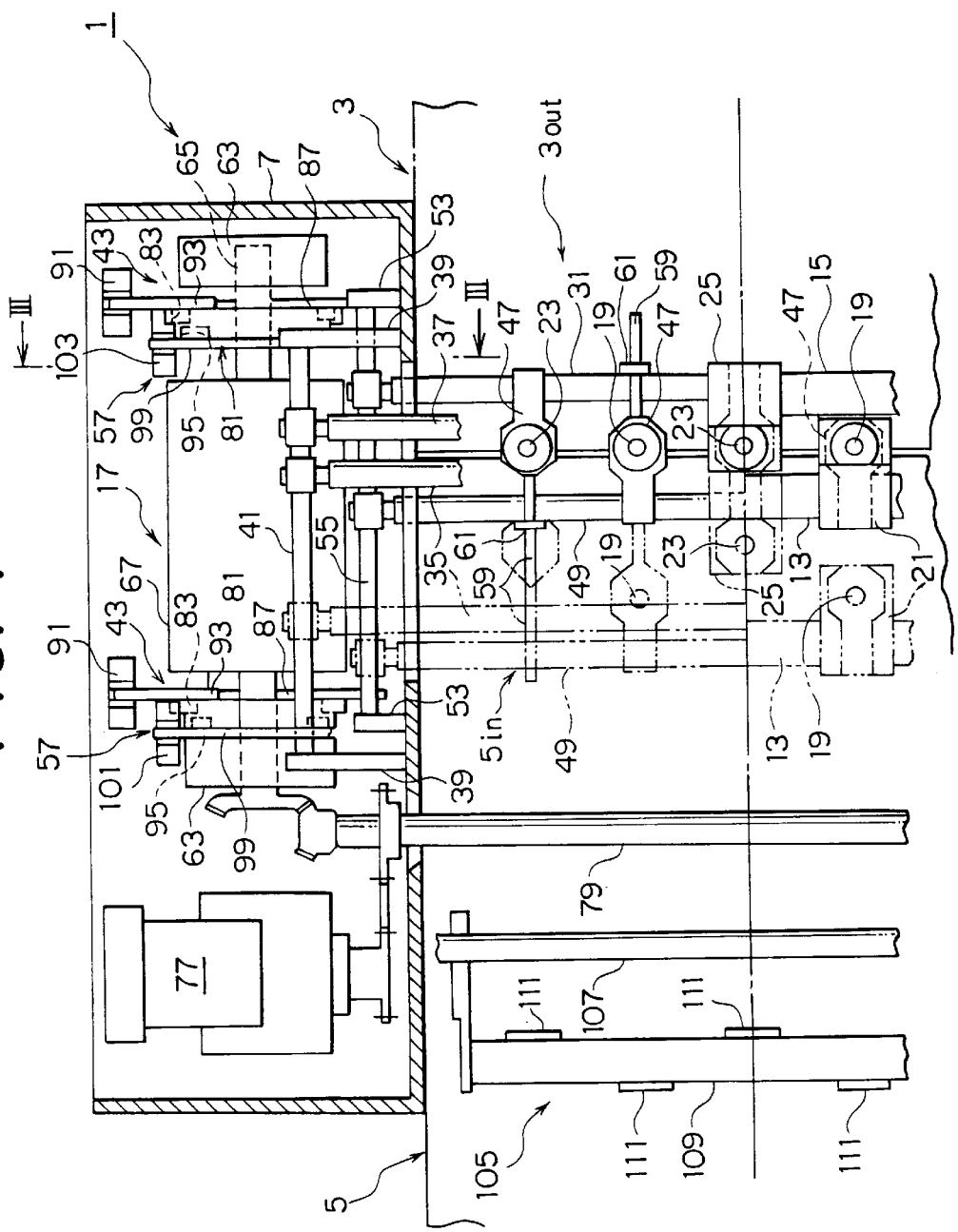
FIG. 1 is a plan view of a rear part of an embodiment of the apparatus of the present invention.

Each holder 19 or 23 has a support pipe 27 rotatably mounted on the fix block 21 or 25, an ejector 29 mounted on the distal end of the support pipe 27, a pin rod 31 disposed for vertical movement in the support pipe 27, and a plurality of pins 33 mounted on the lower end of the pin rod 31 for penetrating a piece of dough from above. These pin rods 31 of the first holders 19 are connected by a first pin-rod-connecting bar 35 which extends transversely, and similarly the pin rods 31 of the seconds holders 23 are connected by a second pin-rod-connecting bar 37 which extends transversely. Each pin-rod-connecting bar 35 or 37 for lateral movement is respectively mounted at both its ends on guide rods 41, 41, which for vertical movement are mounted on the support frames 7, 7 through support arms 39, 39 (only one guide rod 41 is shown in FIG. 1). By means of a pin-rod-operating device 43 (this is explained below), the first and second holders 19, 23 can lower the pin-rod-connecting bars 35, 37 to cause the penetrating pins 33 to extend downward through the ejectors 29, or can raise the bars 35, 37 to retract the pins 33 upward from the ejectors 29.

Figure 4:
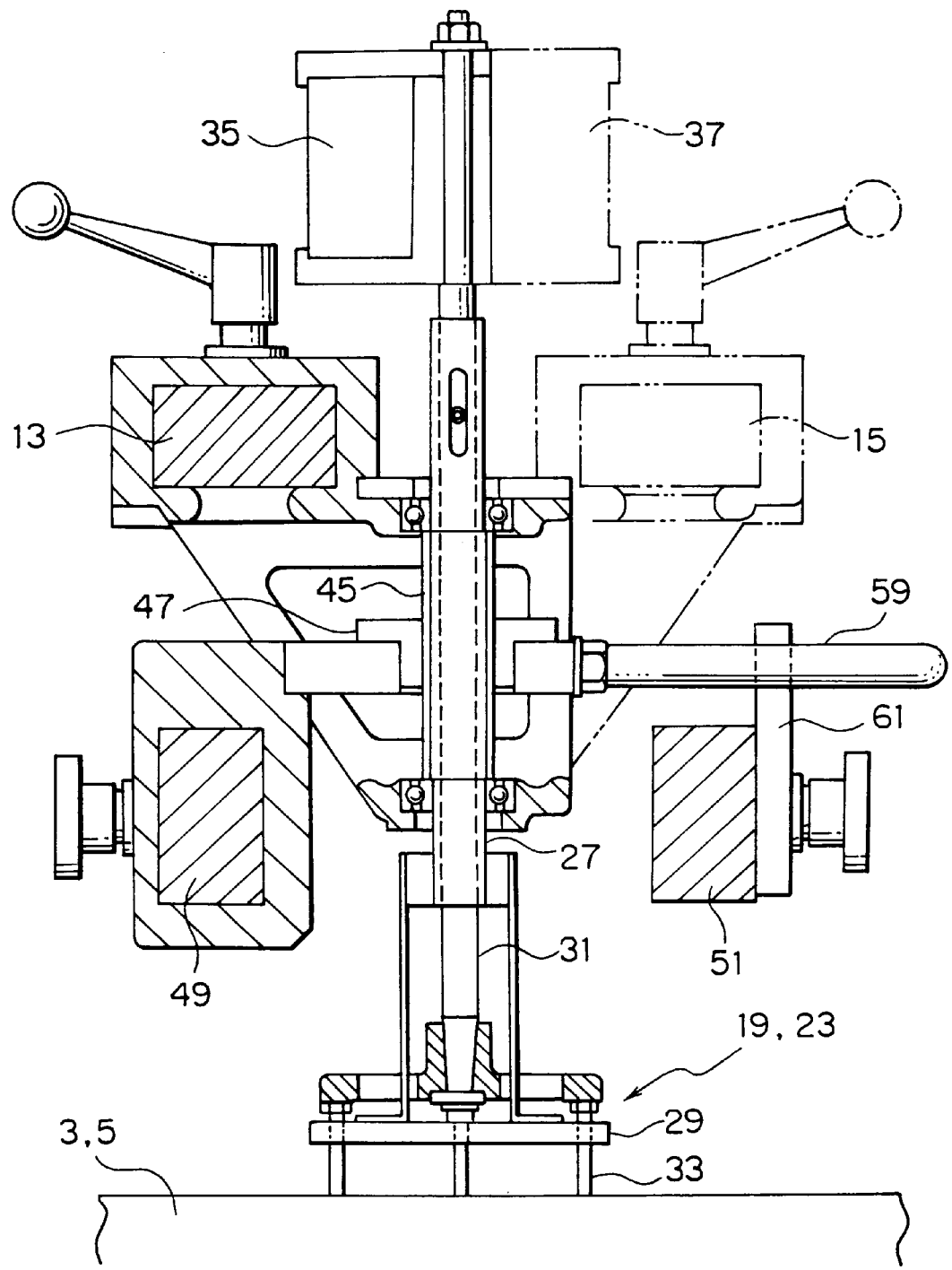
FIG. 4 is a partly sectional side view taken along line IV—IV in FIG. 2.

A screw member 45 is secured to each holder 19 or 23 (FIG. 4), and a nut 47, which can be vertically movable, is threaded on the screw member 45. The nuts 47 of the holders 19, 23 are connected by connecting bars 49, 51 that move the screw members 45 to rotate the holders. For lateral movement, the connecting bars 49, 51, at both their ends, are mounted on guide rods 55, 55, which in turn are mounted on the support frames 7, 7 through brackets 53, 53 (only one guide rod 55 is shown in FIG. 1). The holders 19, 23 are rotated clockwise or counterclockwise through 90 degrees by a rotating mechanism 57 during the lateral reciprocation of the first and second carriages 13, 15 such that the holders 19, 23 change the direction they rotate while being connected to the carriages and in connection with every lateral and forward movement of the carriages. A sliding shaft 59, which extends laterally, is attached to each nut 47, and a guide plate 61, which guides the lateral sliding of the sliding shaft 59, is attached to the connecting bar 49 or 51, as shown in FIGS. 1 and 4.

Figure 2:
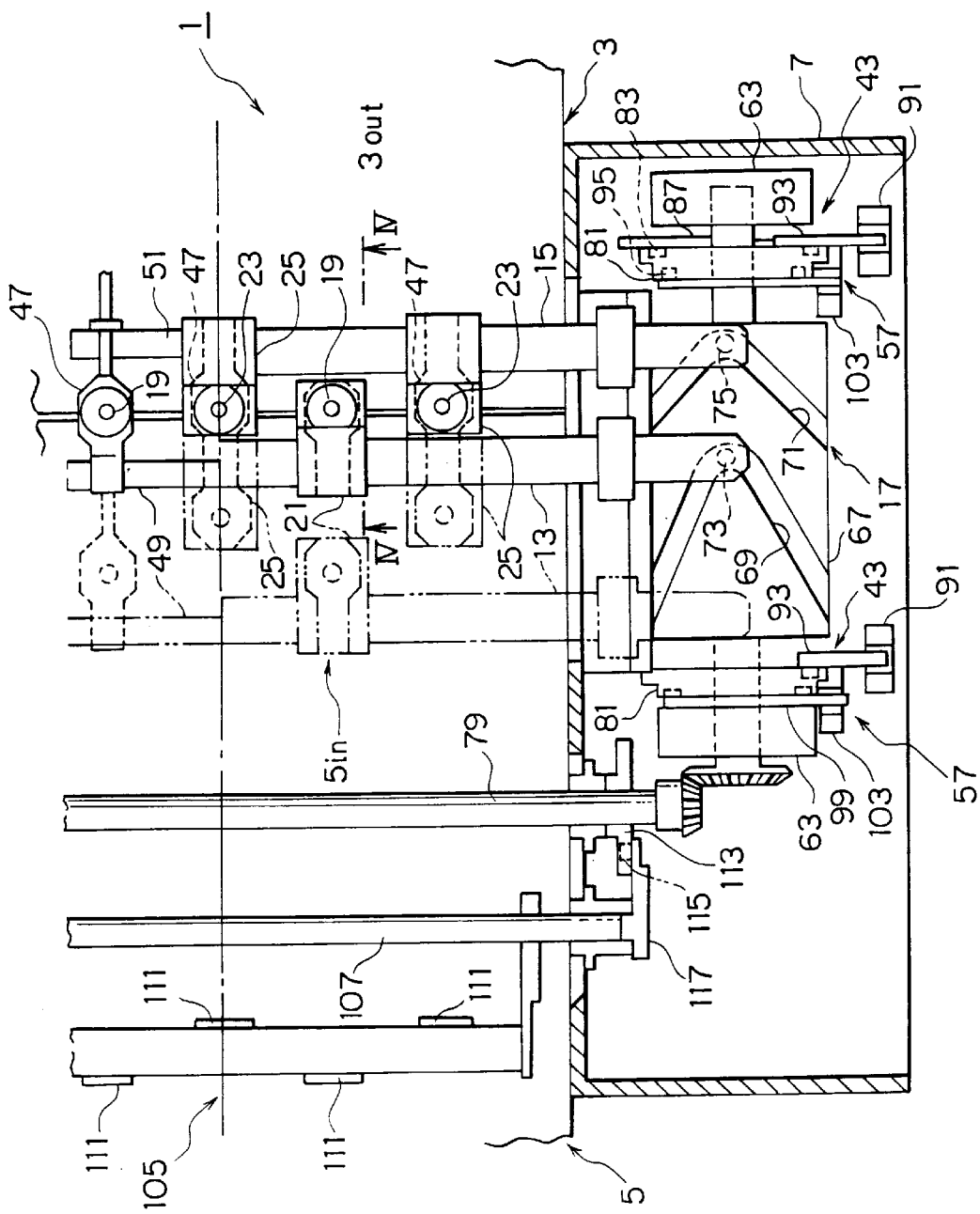
FIG. 2 is a plan view of a front part of the embodiment of the apparatus shown in FIG. 1.
Figure 3:
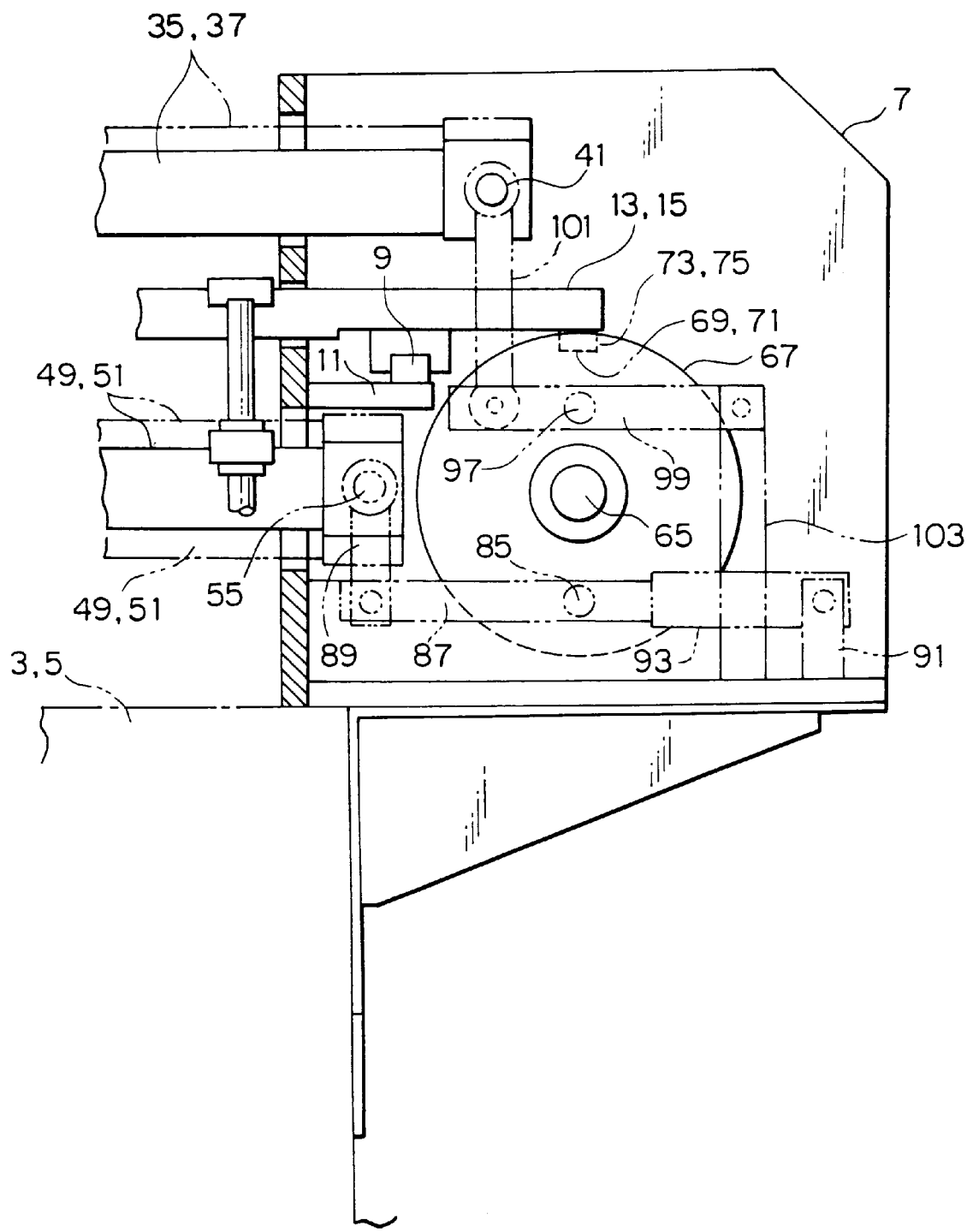
FIG. 3 is a partly sectional side view taken along line III—III in FIG. 1.

The reciprocatingly-operating device 17 is now explained in detail. In FIGS. 1–3 a pair of support members 63, 63, which are laterally spaced apart from each other, are mounted on each support frame 7. A rotary shaft 65, which extends laterally, is journaled in the pair of support members 63, 63 of each support frame 7. A cylindrical separating cam 67 is secured on the rotary shaft 65. First and second separating cam grooves 69, 71 are formed in the cylindrical surface wall of the cam 67. The first separating cam groove 69 receives and supports a first separating mover (cam follower) 73 so that the mover 73 can move laterally. The mover 73 is connected to one end of the first carriage 13. The second separating cam groove 71 receives and supports a second separating mover 75 so that the mover 75 can move laterally. The mover 75 is connected to one end of the second carriage 15. The shapes of the first and second separating cam grooves 69, 71 are defined such that the lateral reciprocating strokes of the first separating mover 73 (i.e., the first carriage 13) are longer than those of the second separating mover 75 (i.e., the second carriage 15), as shown in FIG. 6.

To rotate the rotary shaft 65, a drive motor 77 is mounted on the rear support frame 7, and a drive shaft 79, which extends transversely and which is mounted on the frames 7, 7 downstream of the carriages 13, 15, is connected to the motor 77. Each end of the drive shaft 79 is connected to a respective end of each rotary shaft 65.

The mechanism 57, which moves the nuts 47, is now explained in detail. A pair of multiple cams 81, each of which is concentric to a respective rotary shaft 65, are integrally fixed to it, as shown in FIG. 1. Each multiple cam 81 has two plane groove cams, one of which is a rotating cam groove 83 located at its right side (FIG. 1). The rotating cam groove 83 receives and supports a rotating mover 85 FIG. 3) such that it can move vertically in the groove 83. The rotating mover 85 is connected to the connecting bars 49, 51 through a pair of links 87, 89 and the guide rod 55. The proximal end of the link 87 is connected to an auxiliary link 93, which for vertical movement is pivotably mounted on a support block 91 so that the link 87 can move laterally relative to the auxiliary link 93. The shape of the rotating cam groove 83 is defined so that during two lateral reciprocating strokes of the separating movers 73, 75, as in FIG. 6, the rotating mover 85 moves vertically from the return stroke end of its forward stroke to the middle of the forward stroke by the time the separating movers 73, 75 start their first forward strokes and reach their first forward stroke end, and the rotating mover 85 moves vertically from the forward stroke end of its return stroke to the middle of the return stroke by the time the separating movers 73, 75 start their second forward strokes after they complete their first return strokes and reach their second forward stroke end.

The pin-operating device 43 is now explained in detail. The multiple cam 81 acts as a plane groove cam which rotates the holders 19, 23 and acts as another plane groove cam which vertically moves the penetrating pins 33. Each multiple cam 81 is provided with a pin cam groove 95 at the left side of the rotating cam groove 83. The pin cam groove 95 receives and supports a pin mover 97, which is connected to the connecting bars 35, 37 through a pair of links 99, 101 and the guide rod 41. The proximal end of the link 99 is connected to a support block 103, which is, for vertical movement, pivotably mounted on the support frame 7.

According to this structure, holders 19, 23 hold and release the pieces of dough W as explained below. Before the carriages 13, 15 (i.e., separating movers 73, 75) start their forward strokes from their return stroke ends, the multiple cams 81 and separating cams 67 are rotated to lower the pin movers 97 to cause the penetrating pins 33 of the holders 19, 23 to project from the ejectors 29. Thus these pins 33 penetrate and hold the pieces of dough W.

Further, before the carriages 13, 15 (i.e., the separating movers 73, 75) start their return strokes from their forward stroke end, the multiple cams 81 and separating cams 67 are rotated to raise the pin movers 97 to cause the penetrating pins 33 to retract into the ejectors 29, thereby releasing the pieces of dough W from the pins 33.

A reverse-driven shaft 107, which extends transversely, is mounted downstream of the carriages 13, 15. Another reverse-driven shaft 109, which also extends transversely, is attached to the shaft 107. A plurality of positioning plates 111, arranged in a staggered layout, are attached to the shaft 109 so that they can receive the triangular pieces of dough W at their bases Wb, which are in the staggered layout. To vertically rotate the shaft 109 through the shaft 107 in unison with the rotation of the separating cams 67, a cam 113, comprised of a plate cam, is attached to each end of the drive shaft 79, and a reverse-driven link 117, provided with a mover 115 that rotates vertically, is attached to each end of the shaft 107.

The operation of the apparatus 1 is now explained. When the groups WG of pieces of dough W (FIG. 5) are conveyed on the upstream conveyor 3 and passed to the downstream conveyor 5, the first and second holders 19, 23 hold a group of the pieces of dough. By operating the motor 77 the separating cams 67 are rotated to laterally move the first and second separating movers 73, 75 in their forward strokes. As was already explained, the reciprocating strokes of the first separating movers 73 are longer than those of the second separating movers 75, and they move in phase in their forward strokes. Accordingly, the pieces of dough W of the group are separated and located in a transversely staggered layout. The pieces of dough are then released, and by operating the motor 77 the separating cams 67 are rotated to laterally move the separating movers 73, 75 (carriages 13, 15) in their return strokes. Thus by reciprocating the carriages 13, 15 many times the pieces of dough W of the group WG are separated group-by-group.

While the carriages 13, 15 reciprocate many times, rotating the multiple cams 81 and separating cams 67 causes the rotating movers 85 to reciprocate vertically. As explained above, the screw members 45 are threaded by the nuts 47, and the movers 85 vertically reciprocate once while the separating movers 73, 75 reciprocate twice. Thus the holders 19, 23 rotate substantially through 90 degrees while the direction that they rotate changes per forward stroke of the carriages 13, 15 in phase with the forward stroke. Thus the bases of the pieces of dough face toward downward in the staggered layout and are received by the positioning plates 111 above the downstream conveyor 5.

What we claim is:

1. A method of laterally conveying pieces of dough, each of which has a base, and which are arranged laterally and transversely, by an upstream and a laterally adjacent downstream conveyor, wherein the bases of transverse rows of the pieces of dough, each row defining a group, face in opposing directions group-by-group on the upstream conveyor, the method comprising the steps of:

(i) sequentially conveying the pieces of dough group-by-group from a discharge portion of the upstream conveyor to a take-in portion of the downstream conveyor; and (ii) separating each group of the pieces of dough from the remaining groups when the groups are conveyed to the take-in portion and simultaneously arranging the group of the pieces of dough in a transversely staggered layout and simultaneously rotating each group of pieces of dough substantially through 90 degrees group-by-group so that the base of each piece of the dough faces downstream.

2. An apparatus for laterally conveying pieces of dough, each of which has a base, from an upstream conveyor, where the pieces of dough are arranged laterally and transversely and the bases of transverse rows of the pieces of dough, each row defining a group, face in opposing directions group-by-group, to a laterally adjacent downstream conveyor where each group is separated from the remaining groups and each of the pieces of dough of the group is separated from each other and rotated substantially through 90 degrees in opposite directions group-by-group to be positioned in a transversely staggered layout, comprising:

a first and second carriage mounted for lateral movement at the junction of the upstream and downstream conveyors, the first and second carriage being laterally spaced apart from each other;

means for laterally reciprocating the first and second carriages in phase such that lateral reciprocating strokes of the first carriage are longer than those of the second carriage;

first holders, each for rotation about a vertical axis to hold and rotate a piece of dough, mounted on one side of the first carriage;

second holders, each for rotation about a vertical axis to hold and rotate a piece of dough, mounted on one side of the second carriage, the first and second holders being transversely aligned; and a rotating mechanism for rotating the first and second holders substantially through 90 degrees in opposing directions per forward stroke of the first and second holders when the first and second carriages are laterally reciprocated a plurality of times.

3. The apparatus of claim 2, wherein the means for laterally reciprocating the first and second carriages includes separating cams which are rotated by a drive motor about laterally extending respective axes of rotation, first separating movers connected to the it carriage for laterally movement by the rotation of the separating cams, and second separating movers connected to the second carriage for lateral movement by the rotation of the separating cams, and wherein the lateral reciprocating strokes of the first separating movers are longer than those of the second separating movers so that the lateral reciprocating strokes of the first carriage are longer than those of the second carriage.

4. The apparatus of claim 3, wherein the separating cams are cylindrical groove cams having cylindrical outer surfaces in which the first separating cam grooves for movably receiving the first separating movers are formed and in which second separating cam grooves for movably receiving the second separating movers are formed, the first and second separating cam grooves being shaped such that the lateral reciprocating strokes of the first separating movers are longer than those of the second separating movers.

5. The apparatus of claim 3, wherein a screw member is securely attached to each holder, a nut for vertically movement is threaded on each screw member, and the nuts of the holders are connected by a connecting bar, and wherein the means for laterally reciprocating the first and second carriages includes rotating cams concentrically and securely attached to the separating cams and rotating movers connected to the connecting bar for moving vertically by the rotation of the rotating cams such that the rotating movers can vertically reciprocate once while the separating movers are laterally reciprocated twice.

6. The apparatus of claim 5, wherein the rotating cams are plane groove cams having cam grooves at their sides for movably receiving the rotating movers, and wherein the plane groove cams are shaped such that the rotating movers rotate vertically while the separating movers are reciprocated laterally twice.

7. The apparatus of claim 6, wherein the rotating cam grooves are shaped such that during the two lateral reciprocating strokes of the separating movers the rotating movers move vertically from a return stroke end of a forward stroke thereof to the middle of the forward stroke, and the rotating cam grooves move vertically from a forward stroke end of a return stroke thereof to the middle of the return stroke by the time the separating movers start second forward strokes thereof and reach stroke ends of the second forward strokes.

8. The apparatus of claim 2, wherein the holders hold pieces of dough from above before the carriages start lateral forward strokes from a return stroke end thereof and release the pieces of dough before the carriages start lateral return strokes from a forward stroke end thereof.

9. The apparatus of claim 3, wherein each holder includes a pin-operating device comprised of a support pipe rotatably mounted on the carriage, an ejector mounted on the lower portion of the support pipe, a pin rod mounted for vertical movement in the pin rod, penetrating pins attached to a lower portion of the pin rod for penetrating the piece of dough, the penetrating pins being ejectable and retractable from the ejector, and a connecting bar for connecting the pin rods of the holders, wherein the penetrating pins are projected downward from the ejector by lowering the connecting bar for pin rods before the carriages start lateral forward strokes from a return stroke end thereof, and are retracted upward into the ejector by raising the connecting bar for pin rods before the carriages start lateral return strokes thereof from a forward stroke end thereof.

10. The apparatus of claim 9, wherein the pin-operating device includes a pin cam concentrically and securely attached to the separating cam, and pin movers connected to the connecting bars for pin rods for vertical movement by the rotation of the pin cam, wherein the pin movers move downward before the separating movers start lateral return strokes thereof from a return stroke end thereof, and move upward before the separating movers start lateral forward strokes thereof from a forward stroke end thereof.

11. The apparatus of claim 10, wherein the pin cam is a plane groove cam for a pin, and the plane groove cam is shaped such that the pin movers move downward before the separating movers start lateral forward strokes thereof from a return stroke end thereof, and move upward before the separating movers start lateral return strokes thereof from a forward stroke end thereof.

12. The apparatus of claim 3, wherein an arranging device is mounted at the downstream of the carriages for arranging pieces of dough of each group in a transverse and staggered layout.

13. The apparatus of claim 12, wherein the arranging device includes a rotating bar extending transversely for vertical rotation and a plurality of arranging plates mounted on the rotating bar in a transverse and staggered layout, wherein the rotating bar is vertically rotatable while being connected to the separating cams and in connection with the rotation of the separating cams.

* * * * *